United States Patent [19]

Krallmann et al.

[11] Patent Number: 5,501,905
[45] Date of Patent: Mar. 26, 1996

[54] MATT BIAXIALLY STRETCHED POLYPROPYLENE FILM AND A PROCESS FOR PRODUCING THE SAME

[75] Inventors: Anton Krallmann, Fallingbostel; Thomas Blum, Schwarmstedt; Ingo Schinkel, Walsrode, all of Germany

[73] Assignee: Wolff Walsrode Aktiengesellschaft, Walsrode, Germany

[21] Appl. No.: 210,845

[22] Filed: Mar. 17, 1994

[30] Foreign Application Priority Data

Mar. 24, 1993 [DE] Germany .................. 43 09 555.0

[51] Int. Cl.⁶ .................................................. B32B 7/12
[52] U.S. Cl. .................. 428/339; 428/349; 428/516; 428/910
[58] Field of Search ................... 428/516, 349, 428/910, 339

[56] References Cited

U.S. PATENT DOCUMENTS 4,522,887  6/1985  Koebisu et al. ................... 428/461

FOREIGN PATENT DOCUMENTS

| 122495 | 10/1984 | European Pat. Off. . |
| 0365463 | 4/1990 | European Pat. Off. . |
| 0564846 | 10/1993 | European Pat. Off. . |

OTHER PUBLICATIONS

JP-A-3 197 541 (Idemitsu Petrochem. KK) (Abstract).
JP-A-04 086 260 (Toyo Seikan K) (Abstract).

*Primary Examiner*—Edith Buffalow
*Attorney, Agent, or Firm*—Sprung Horn Kramer & Woods

[57] ABSTRACT

This invention relates to matt, multilayered propylene films to which their matt appearance is imparted by a one-sided, coextruded layer of a polymer mixture.

7 Claims, No Drawings

MATT BIAXIALLY STRETCHED POLYPROPYLENE FILM AND A PROCESS FOR PRODUCING THE SAME

This invention relates to matt, multilayered propylene films whose matt appearance is produced by least one one-sided, coextruded layer of a polymer mixture.

Numerous matt, biaxially stretched polypropylene films are already known.

Thus DE-A 3 231 013 specifically describes a polypropylene film with a rough surface which is produced by exposing the film to high energy radiation before it is stretched.

JP 9 148 661 describes a process for producing a rough surface on a biaxially stretched polypropylene film by sandblasting or by chemical etching.

An increasing semi-opacity obtained by the addition of organic peroxides to propylene/ethylene block copolymers and to copolymers based on polyethylene is described in JP 2 103 214.

In DE-A 3 839 120, a rough surface is produced by 5 to 10% of inorganic fillers which are applied through the whole thickness of an orientated polypropylene film.

A one-sidedly matt coating of inorganic and/or organic matting agent with an ester resin which is applied from organic solvents is described in EP-A 262 953.

In JP 8 038 157 and JP 3 129 264, rough surfaces are produced by $\alpha$- and $\beta$-spherulites of the polypropylene.

Matt films in which the matt effect is produced by block copolymers of propylene and of ethylene or by mixing polypropylene homo- and/or copolymers with polyethylene are described in numerous Patents.

Thus a non-glossy, biaxial polypropylene film which consists throughout the thickness of the film of a blend of polypropylene with 10 to 65% of polyethylene is described in JA 6 032 668.

A multilayered film with slight surface gloss is produced by laminating a monoaxially stretched polypropylene film with a mixture of propylene/ethylene copolymer and high density polyethylene and subjecting the whole laminate to transverse stretching (JP 8 001 525).

EP-A 122 495 describes an at least 2-layered biaxially stretched polypropylene film in which at least one layer consists of a polyolefin containing from 10 to 50% by weight of ethylene. An ethylene/propylene block copolymer having three melting ranges within the temperatures of from 120° to 160° C. is described as an example.

EP-A 44 544 describes a multilayered, stretched polypropylene film having a two-layered polypropylene structure to which a mono- or biaxially stretched propylene/ethylene block copolymer layer is applied. The option of an additional layer of adhesive is left open.

A non-glossy, laminated film produced by biaxial stretching of polypropylene containing from 10 to 50% of ethylene is described in JP 0 184 840.

DE-A-42 09 918 describes a film structure in which the matt layer consists of a propylene/ethylene block copolymer, a propylene/ethylene/(butyelene) random co- or terpolymer, an ethylene-based co- or terpolymer modified with polar groups and, optionally, polyamide.

JP 0 054 783 also describes a biaxially stretched film which has a rough surface produced by a propylene/ethylene block copolymer.

Matt surfaces may also be obtained by laminating one-sidedly stretched ethylene/propylene copolymers to a biaxially stretched polypropylene film.

Some of the processes for the production of biaxially stretched polypropylene films are quite expensive or require high investment costs (e.g. chemical etching processes, sandblasting, electron beam hardening, lacquering). Other films fail to satisfy the requirements of the market in their optical properties, capacity for being sealed or capacity for taking printed matter. It was therefore an object of the present invention to meet the requirements of the market and to produce a matt film in existing plants using the already available coextrusion apparatus for biaxially stretched polypropylene.

The present invention relates to matt, two-layered or multilayered, biaxially stretched polypropylene films comprising an outer matt layer M, a core layer K and selectively other layers S which are adjacent to the core layer on the side opposite to the matt layer, and to polymer mixtures from which the matt layer can be produced, characterised in that the matt layer M has a thickness of from 0.5 to 5.0 µm and is produced from 25–75 % of one or more polypropylene/polyethylene block copolymers, 5–15 % of an ethylene-based co- or terpolymer modified with polar groups and elastomeric components, 15–40 % of a random co- and/or terpolymer built up of propylene/ethylene/butylene and containing propylene as the main component, 5–20 % of a high density polyethylene and 0–2 % of a natural or synthetic silica, the above-mentioned components being used in the state delivered and/or in the form of batches of these, and in that the core layer K consists of a thermoplastic polymer and/or copolymer of propylene which may be equipped with conventional slip agents, antistatic agents and/or antiblocking agents, in that the layers S adjacent to the core layer K on the side opposite to the matt layer consist either of a thermoplastic polypropylene which may be equipped with conventional slip agents, antistatic agents and/or antiblocking agents and/or of a thermoplastic, random copolymer of polypropylene with one or more $\alpha$-olefins having 2 to 6 carbon atoms, which may be equipped with conventional slip agents, antistatic agents and/or antiblocking agents, or of a layer of mixtures of ethylene-based copolymers which can be laminated in the heat, or of a combination of the above mentioned layers.

The following may be used as starting materials for the matt layer M:

1. Polypropylene copolymers obtained from propylene and $\alpha$-olefins, preferably ethylene, by a process of block polymerisation or heterophasic copolymers of ethylene and propylene or rubber-modified polypropylene or PP block copolymers and reactor blends.

2. Linear copolymers of low density ethylene which are modified and/or low density polyethylenes which are rubber-modified and have an anhydride functionality and/or terpolymers of ethylene with acrylic acid esters and maleic acid anhydride.

3. Random propylene/ethylene copolymers containing 2 to 6% by weight of ethylene or random terpolymers of propylene, ethylene and butylene having a co-monomer content below 15% by weight and a butylene content below 7% by weight.

4. High density polyethylene in a density range of from 0.94 to 0.965 and a melt index of from 0.3 to 5 g/min at 190° C. under a load of 50N.

6. Synthetic and/or natural silica/SiO$_2$ particles having a particle size<10 μm.

The following serve as starting materials for the core layer K:

An isotactic polypropylene having an n-heptane soluble content of 15% by weight or less, a density of from 0.90 to 0.91 g/cm$^3$ and a melt flow index of from 0.5 g/10 min to 8 g/10 min at 230° C. under a load of 21.2N (determined according to DIN 53735), a polypropylene having a melt flow index of from 1 to 4 g/10 min being particularly preferred, and/or a random propylene/ethylene copolymer containing 2 to 6% by weight of ethylene and having a density of, preferably, from 0.895 to 0.960 g/cm$^3$, a melt index of from 1 to 7 g/10 min at 230° C. under a load of 21.2N and a crystalline melting point in the range of from 125° to 148° C. (under the polarisation microscope), depending on the type.

and/or a propylene/butylene/ethylene copolymer having a comonomer content of preferably<15% by weight and a butylene content of preferably< 7% by weight, preferably with a melt flow index of from 0.1 to 16 g/10 min at 230° C. under a load of 21.2N, most preferably from 4 to 10 g/10 min at 230° C. and under load of 21.2N.

The following serve as starting materials for the layers S:

Isotactic polypropylene and/or random co- and/or terpolymers which may also be used as starting materials for the core layer and/or a mixture for hot laminating which in its preferred embodiment consists of ethylene/vinyl acetate copolymers A and at least one other copolymer selected from the group of ethylene/ethyl acrylate copolymers B1 or the group of ethylene/acrylic acid copolymers B2.

In a preferred embodiment, the ethylene/vinyl acetate copolymer A) contains from 70 to 95% by weight, in particular from 75 to 95% by weight, of polymerised ethylene units, and in a particularly preferred embodiment the remainder consists mainly or completely of polymerised vinyl acetate.

In a preferred embodiment, the ethylene/ethyl acrylate copolymer B1) consists substantially of polymerised ethylene units, in particular at least 88% by weight of polymerised ethylene units, in particular from 88 to 92% by weight of polymerised polyethylene units, the remainder consisting mainly or completely of polymerised ethyl acrylate.

In a preferred embodiment, the ethylene/acrylic acid copolymer B2) consists substantially of polymerised ethylene units, in particular at least 85% by weight of polymerised ethylene units, most preferably from 85 to 95% by weight of polymerised ethylene units, the remainder consisting substantially or completely of polymerised acrylic acid.

The ethylene/vinyl acetate copolymer A preferably has a melt flow index of from 0.1 to 15 g/10 min at 230° C. and 21.2N, most preferably from 0.3 to 8 g/10 min at 230° C. and 21.2N.

Films of the type mentioned above are produced by first coextruding a 3-layered film. After leaving the broad sheeting die, this coextruded film is cooled under such conditions that the matt layer cools down as slowly as possible. The film is then again heated to about 100°–130° C. and is longitudinally stretched in a ratio of from 3 to 7, preferably from 4 to 5. After the longitudinal stretching, the film is transversely stretched by a ratio of 7 to 12, preferably 8 to 9, at temperatures of from 150° to 170° C. The film is thermofixed before leaving the stretching tunnel. Before it is rolled up, it is treated at least on one side with a corona discharge or a flame pretreatment.

As an alternative to the process described above for the production of a 4-layered film, a 3-layered coextrusion of the matt layer M, the core layer K and, if present, a layer S is carried out, which layers are first longitudinally stretched all together, as described above. Between leaving the longitudinal stretching part and entering the transverse stretching part, lamination or extrusion with another layer S takes place as described in EP 0 424 761 A2. After the application of this layer, the whole combination film is trans-versely stretched in a ratio of from 1:7 to 1:12, preferably from 1:8.5 to 1:9.5 and this is followed in the usual manner by thermofixing and corona treatment or flame pretreatment.

It was surprising to the man of the art to find that the matt effect of coextruded, biaxial polypropylene films can be permanently increased if a polyethylene of high density is added in the given concentration ranges to mixtures of PP/PE block copolymers and random copolymers and to the modified ethylene.

The ethylene-based co- or terpolymers used, which carry polar groups and are elastomer-modified, are normally used as bonding agents in an interlayer of composite films for joining together two adjacent polymer layers which cannot stick together. In such a combination, the bonding layer does not impair the optical properties. The values for cloudiness and clarity of the film are not altered.

When used as component in a matt layer lying on the surface of the film, they reduce the gloss which determines inter alia the matt appearance of the biaxially stretched films.

The given formulations, which are a subject matter of this Patent, produce a matt appearance of films which are biaxially stretched.

In addition, the layer thickness of the matt layer can be varied over a wide range in biaxially orientated polypropylene films produced with a matt layer in accordance with the above formulation without producing any change in the optical properties. Matt films are obtained even with layer thicknesses<2 μm.

The film according to the invention preferably has a total thickness of from 10 to 40 μm.

The matt layer M is characterised in that it preferably has a thickness of 1 to 4 μm and consists of 25–75 % of polypropylene copolymers produced by a process of block copolymerisation, 5–15% of an ethylene based co- or terpolymer modified with polar groups, 15–40% of a random copolymer of propylene and ethylene having an ethylene content of from 2 to 6% by weight, 5–20% of a high density polyethylene and 0–2% of a natural silica.

The core layer preferably has a thickness of

| | |
|---|---|
| 9–39 μm | and consists of |
| 97–100% | of an isiotactic polypropylene having a melt index of 0.5 to 8 g/10 min (230° C./21.2 N), and |
| 3–0% | of slip agents, antistatic agents and/or antiblocking agents. |

The layers S either have a preferred thickness of from 0.5 to 1.5 μm and consist of

| | |
|---|---|
| 97–100% | of an isotactic polypropylene having a melt index of from 0.5 to 8 g/10 min (230° C./21.2 N) or a random propylene/ethylene copolymer containing 3 to 5% of ethylene and having a melt index of from 3 to 16 g/10 min (230° C./21.2 N) or a random propylene/ethylene butylene terpolymer having a comonomer content of <12% and a melt index of from 3 to 16 g/10 min (230° C./21.2 N) and |
| 3–0% | of slip agents, antistatic agents and/or antiblocking agents | or they have a preferred thickness of from 3 to 15 μm and consist of
65–95 % of ethylene/vinyl acetate copolymers,
10–35 % of ethylene/ethyl acrylate copolymers and
8–30% of ethylene/acrylic acid copolymers.

A film according to the invention is used as adhesive or thermolaminating film for the graphics industry or as heat sealable film for the manufacture of bags or of composite films.

The following test methods and processes for the determination of the values and properties are employed in the examples which follow:

The gloss is determined according to ASTM D 2457 in terms of the proportion of light in gloss units GE reflected at an angle of 45° based on a black glass mirror, using 100 GE as standard.

Cloudiness is determined according to ASTM D 1003. It is expressed in percent and is the ratio of diffuse light transmission to the total light transmission multiplied by 100.

EXAMPLES

Substances used for the matt layers

Polymer 1

Block copolymer PP/PE
MFI* (230° C./21.2N) 3 g/10 min

*MFI = Melt flow index
Melting point (DSC)* 162° C.
*DSC= Differential Scanning Colorimetry
Modulus of elasticity (DIN 53457) 1300N/mm $^2$ Polymer 2

LDPE elastomer modified and acid-anhydride-modified
MFI* (230° C./21.2N) 4.3 g/10 min
*MFI = Melt flow index
Melting point (DSC)* 104 ° C.
*DSC= Differential Scanning Colorimetry Polymer 3

LLDPE modified with elastomeric and acid anhydride components
MFI* (230° C./21.2N) 6.2 g/10 min
*MFI = Melt flow index
Melting point (DSC)* 125° C.
*DSC= Differential Scanning Colorimetry Polymer 4

P/E Random copolymer containing 1000 ppm $SiO_2$
MFI* (230° C./21.2N) 4.7 g/10 min
*MFI = Melt flow index
Melting point (DSC)* 140° C.
*DSC= Differential Scanning Colorimetry Polymer 5

High density polyethylene having a density of 0. 956 g/cm $_3$
MFI* (190° C./50N) 1.6 g/10 min
*MFI = Melt flow index
Melting point (DSC) 130° C.

Polymer 6

Isotactic polypropylene containing n-heptane soluble component of 6%
MFI* (230° C./21.2N) 3.3 g/10 min
*MFI = Melt flow index Polymer 7

Mixture of 65–95 % of ethylene/vinyl acetate copolymer
10–35 % of ethylene/ethyl acrylate copolymer
8–30 % of ethylene/acrylic acid copolymer

| | Total thickness [μm] | Film structure number of layers | Layer M of polymer mixture | Mixing ratio [% by weight] | Layer thickness M [μm] | Layer K of polymer | Layer S of polymer | Layer thickness S [μm] | Gloss matt side [GE] | Cloudiness [%] |
|---|---|---|---|---|---|---|---|---|---|---|
| Example | | | | | | | | | | |
| 1 | 15 | 3 | 1/3/5/4 | 55/10/15/20 | 2.3 | 6 | 6 | 1 | 7.6 | 79 |
| 2 | 15 | 3 | 1/3/5/4 | 60/10/10/20 | 2.3 | 6 | 6 | 1 | 7.1 | 78 |
| 3 | 15 | 3 | 1/2/5/4 | 60/10/10/20 | 2.3 | 6 | 6 | 1 | 7.0 | 80 |
| 4 | 20 | 3 | 1/3/5/4 | 65/10/5/20 | 2.3 | 6 | 4 | 1 | 7.9 | 76 |
| 5 | 22 | 3 | 1/2/5/4 | 65/5/10/20 | 2.5 | 6 | 7 | 1 | 8.5 | 72 |
| Comparison Example | | | | | | | | | | |
| 1 | 15 | 3 | 1/2/4 | 60/10/30 | 2.3 | 6 | 6 | 1 | 12.1 | 60 |
| 2 | 15 | 3 | 1/3/4 | 40/10/50 | 2.3 | 6 | 6 | 1 | 13.3 | 49.1 |

Example 1

A mixture of polymers 1/3/5/4 in a ratio of 55/10/15/20 is packed up into a batch. This batch forms the matt layer and is coextruded with a polypropylene layer which is substantially free from anti-blocking agents but contains slip additives and antistatic additives and with a second polypropylene layer containing anti-blocking agents. This is followed by longitudinal stretching in a ratio of 1:4.5 to 1:5.5 followed by transverse stretching in a ratio of from 1:9 to 1:10. Before the film is rolled up it is subjected to a corona pretreatment on the side which is not matt. The film is 15 µm in thickness, the matt layer having a thickness of 2.3 µm ± 0.1 µm, the core layer a thickness of 11.7 µm and layer S a thickness of 1.0 µm. The film is used for the adhesive laminating of printed products.

Example 2

The layer structure and stretching conditions are as described in Example 1. A mixture of polymers 1/3/5/4 in a ratio of 60/10/10/20 is used for the matt layer M.

Example 3

The same as Example 1 but using the polymer mixture 1/2/5/4 in a ratio of 60/10/10/10 for the matt layer.

Example 4

A matt layer composed of a mixture of polymers 1/3/5/4 in a ratio of 65/10/5/20 is coextruded with a polypropylene layer which is substantially free of additives and a sealing layer of Polymer 4 containing the usual additives such as anti-blocking, antistatic and slip agents. This is followed by longitudinal stretching in a ratio of 5:0 followed by transverse stretching in a ratio of from 1:9.

Before the film is rolled up, it is subjected to a corona pretreatment on at least one side. The film has a total thickness of 20 µm composed of a thickness of 2.3 µm for the matt layer, 16.7 µm for the polypropylene layer and 1 µm for the sealing layer. This film is suitable inter alia for printing and for the manufacture of bags on horizontal and vertical tubular bag producing machines and both in its printed and unprinted form it is suitable as starting film for various composite films.

Example 5

A matt layer composed of a mixture of the polymers 1/2/5/4 in the ratio of 65/5/10/20 is coextruded with a polypropylene layer which is substantially free from anti-blocking agents but contains slip and antistatic additives and is then longitudinally stretched in a ratio of 1:5. The heat laminated layer is then laminated or extruded with mixture 7 as described in EP 0 424 761 A2.

Application of the heat laminating layer is followed by transverse stretching of the film in a ratio of 1:9.

The heat laminated film thus produced has a total thickness of 22 µm composed of 2.5 µm for the matt layer, 12.5 µm for the polypropylene layer and 7 µm for the heat laminating layer. Such a film is used for the finishing of printed products for the graphics industry.

Comparison Example 1

Same as Example 1 but using the polymer mixture 1/2/4 a ratio of 60/10/30 for the matt layer.

Comparison Example 2

Same as Example 1 but using the polymer mixture 1/3/4 in a ratio of 40/10/50 for the matt layer.

We claim:
1. Matt two-layered or multilayered, biaxially stretched polypropylene films comprising an outer matt layer M, a core layer K and optionally additional layers S which are adjacent to the core layer on the side opposite to the matt layer, and polymer mixtures from which the matt layer can be produced, wherein the matt layer M has a layer thickness of from 0.5 to 5.0 µm and is composed of

25–75% of one or more polypropylene/polyethylene block copolymers,

5–15% of an ethylene based co- or terpolymer modified with polar groups,

15–40% of a random co- and/ or terpolymer produced from propylene/ethylene/butylene with propylene as main component, 5–20% of a high density polyethylene and 0–5 % of a natural or synthetic silica, the above-mentioned components being used in the state delivered from the supplier or in the form of batches thereof, the core layer K consists of a thermoplastic polymer or copolymer of propylene which may be equipped with conventional slip agents, antistatic agents or anti-blocking agents, the layers S which are adjacent to the core layer on the side opposite the matt layer consist either of a thermoplastic polypropylene which may be equipped with conventional slip agents, antistatic agents or anti-blocking agents, or of a thermoplastic random copolymer of the polypropylene having one or more α-olefins containing 2 to 6 carbon atoms, which may be equipped with conventional slip agents, antistatic agents or anti-blocking agents, or of a layer which can be heat laminated, composed of mixtures of ethylene-based copolymers, or of a layer combination of the above-mentioned layer S.

2. Film according to claim 1, wherein the polypropylene of the base layer consists of an isotactic polypropylene with an n-heptane-soluble content of 6% by weight or less.

3. Film according to claim 1, wherein the polypropylene/polyethylene block copolymer contained in the matt layer has an ethylene content of 6–8% by weight and a melt flow index of 3–6 g/10 min (DIN 53 735).

4. Film according to claim 1, wherein the co- or (ter) polymer contained in the matt layer consists of propylene/ethylene/(butylene) and has a propylene content of more than 80% and a melt flow index of 3–6 g/10 min (DIN 53 735).

5. Film according to claim 1, wherein, the high density polyethylene (HDPE) contained in the matt layer has a melt flow index of 1–2 g/10 min (DIN 53 735).

6. Film according to claim 1, where in the ethylene-based co- or terpolymer contained in the matt layer and modified with polar groups has a melt flow index of 3–8 g/10 min (DIN 53 735 at 190° C.).

7. An article wrapped in a film according to claim 1.

* * * * *